US012800116B2

(12) United States Patent
Van Bommel et al.

(10) Patent No.: US 12,800,116 B2
(45) Date of Patent: Nov. 17, 2026

(54) LED FILAMENT ARRANGEMENT COMPRISING INDIVIDUALLY CONTROLLED LEDS

(71) Applicant: SIGNIFY HOLDING B.V., Eindhoven (NL)

(72) Inventors: Ties Van Bommel, Horst (NL); Erik Petrus Johannes Mallens, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/159,634

(22) PCT Filed: Feb. 23, 2024

(86) PCT No.: PCT/EP2024/054714
§ 371 (c)(1),
(2) Date: Aug. 26, 2025

(87) PCT Pub. No.: WO2024/179943
PCT Pub. Date: Sep. 6, 2024

(65) Prior Publication Data
US 2026/0235266 A1 Aug. 13, 2026

(30) Foreign Application Priority Data
Feb. 28, 2023 (EP) .................................... 23158956

(51) Int. Cl.
*F21K 9/64* (2016.01)
*F21K 9/232* (2016.01)
(Continued)

(52) U.S. Cl.
CPC .............. *F21K 9/64* (2016.08); *F21V 23/003* (2013.01); *F21K 9/232* (2016.08); *F21K 9/60* (2016.08);
(Continued)

(58) Field of Classification Search
CPC ... F21K 9/232; F21K 9/60; F21K 9/64; F21V 23/003; F21V 23/004; F21V 23/005;
(Continued)

(56) References Cited

U.S. PATENT DOCUMENTS 10,950,585 B2 * 3/2021 Li ........................ C09K 11/617
2019/0353328 A1 11/2019 Pickard
(Continued)

FOREIGN PATENT DOCUMENTS

WO 2013121355 A1 8/2013
WO 2021228671 A1 11/2021
WO 2022207603 A1 10/2022

*Primary Examiner* — Colin J Cattanach

(57) ABSTRACT

A LED filament arrangement (100), comprising a first LED filament(s) (110), comprising (a) first array(s) (125) of first LEDs (130) emitting first LED light (135). The first LED filament(s) further comprises (a) first encapsulant(s) (140) enclosing the first array(s) of first LEDs. The first encapsulant(s) comprises a first luminescent material (145) configured to convert the emitted first LED light into first converted light (150). The LED filament arrangement further comprises a second LED filament(s) (155), comprising (a) second array(s) (170) of second LEDs (175) emitting second LED light (180), wherein the emitted second LED light is cyan light. Any of the first LED filament(s) is arranged at at least a distance, D, from any of the second LED filament(s). The LED filament arrangement further comprises a controller (185) coupled to, and configured to individually control, the first array(s) of the first LEDs and the second array(s) of second LEDs.

15 Claims, 4 Drawing Sheets

(51) Int. Cl.

| | |
|---|---|
| ***F21K 9/60*** | (2016.01) |
| ***F21V 23/00*** | (2015.01) |
| ***F21V 23/04*** | (2006.01) |
| ***H05B 45/10*** | (2020.01) |
| ***H05B 45/20*** | (2020.01) |
| ***H05B 45/357*** | (2020.01) |
| ***H05B 45/3574*** | (2020.01) |
| ***H05B 45/3577*** | (2020.01) |
| ***H05B 45/46*** | (2020.01) |
| ***H05B 45/48*** | (2020.01) |

(52) U.S. Cl.

CPC ........... *F21V 23/004* (2013.01); *F21V 23/005* (2013.01); *F21V 23/006* (2013.01); *F21V 23/007* (2013.01); *F21V 23/008* (2013.01); *F21V 23/009* (2013.01); *F21V 23/0435* (2013.01); *F21V 23/045* (2013.01); *H05B 45/10* (2020.01); *H05B 45/20* (2020.01); *H05B 45/357* (2020.01); *H05B 45/3574* (2020.01); *H05B 45/3577* (2020.01); *H05B 45/46* (2020.01); *H05B 45/48* (2020.01)

(58) Field of Classification Search

CPC .... F21V 23/006; F21V 23/007; F21V 23/008; F21V 23/009; F21V 23/0435; F21V 23/045; H05B 47/10; H05B 47/155; H05B 47/165; H05B 47/175; H05B 47/185; H05B 47/187; H05B 47/19; H05B 47/195; H05B 47/196; H05B 47/1965; H05B 47/197; H05B 47/1975; H05B 47/198; H05B 47/1985; H05B 47/199; H05B 47/1995; H05B 45/10; H05B 45/20; H05B 45/357; H05B 45/3574; H05B 45/3577; H05B 45/46; H05B 45/48

See application file for complete search history.

(56) References Cited

U.S. PATENT DOCUMENTS

| | | | |
|---|---|---|---|
| 2021/0329757 | A1 | 10/2021 | Peeters et al. |
| 2022/0196214 | A1 | 6/2022 | Van Bommel et al. |

* cited by examiner

LED FILAMENT ARRANGEMENT COMPRISING INDIVIDUALLY CONTROLLED LEDS

CROSS-REFERENCE TO PRIOR APPLICATIONS

This application is the U.S. National Phase application under 35 U.S.C. § 371 of International Application No. PCT/EP2024/054714, filed on Feb. 23, 2024, which claims the benefit of European Patent Application No. 23158956.5, filed on Mar. 28, 2023. These applications are hereby incorporated by reference herein.

FIELD OF THE INVENTION

The present invention generally relates to the field of light-emitting diode, LED, filament arrangements. More specifically, the present invention relates to a LED filament arrangement comprising individually controlled LEDs.

BACKGROUND OF THE INVENTION

The use of light emitting diodes (LEDs) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy. In particular, LED lamps are highly appreciated as they may be very decorative and versatile in appearance.

It is of interest to combine the advantageous properties of LEDs according to the above with the advantageous properties of filament lamps. Filament lamps present an aesthetic design as well as a wide light distribution angle. It will be appreciated that combining filament lamps with the properties of LEDs has become a trend due to the high efficiency of LEDs whilst achieving the resemblance to a traditional incandescent light bulb with a visible filament.

In addition to the above-mentioned combination of features of LEDs and traditional incandescent light bulbs, it will be appreciated that it may be desirable to emit light from such an arrangement having one or more advantageous properties. For example, melanopic light provides the advantages of natural daylight indoors, and may furthermore enhance visual comfort, wellbeing and/or performance of the persons subjected to this kind of light. It should be noted that the biological impact of light within industrial lighting solutions has often been neglected, and a focus on the visual functions of light has often been prioritized. Melanopic light may enable a faster recovery from illness, lower stress levels and/or have a positive impact on the circadian rhythm, whereas (common) indoor electric light fails to address the biological responses to light.

Hence, it is of interest to provide a lighting filament arrangement or system, provided with LEDs, which furthermore can provide melanopic lighting.

SUMMARY OF THE INVENTION

It is an object of the present invention to provide a lighting filament arrangement which can present the traditional appearance of light bulbs combined with the efficiency of LEDs, whilst at the same time providing melanopic lighting.

This and other objects are achieved by a LED filament arrangement having the features in the independent claim. Preferred embodiments are defined in the dependent claims.

Hence, according to the present invention, there is provided a light emitting diode, LED, filament arrangement, configured to emit LED filament arrangement light, comprising at least one first LED filament, configured to emit white LED filament light. The at least one first LED filament comprises a first elongated carrier, at least one first array of a plurality of first LEDs arranged on the first elongated carrier, wherein the plurality of first LEDs is configured to emit first LED light. The at least one first LED filament further comprises at least one first encapsulant at least partially enclosing the first elongated carrier and at least partially enclosing the at least one first array of the plurality of first LEDs, wherein the at least one first encapsulant comprises a first luminescent material configured to at least partly convert the emitted first LED light into first converted light. The emitted white LED filament light comprises at least one of the first converted light and the emitted first LED light. The LED filament arrangement further comprises at least one second LED filament, configured to emit second LED filament light. The at least one second LED filament comprises a second elongated carrier and at least one second array of a plurality of second LEDs arranged on the second elongated carrier, wherein the plurality of second LEDs is configured to emit second LED light. The emitted second LED light is cyan light having a cyan dominant peak wavelength, λ, in a wavelength range of 470-520 nm, wherein the emitted second LED filament light comprises the emitted second LED light. Any LED filament of the at least one first LED filament is arranged (separately) at at least a distance, D, from any LED filament of the at least one second LED filament. The LED filament arrangement additionally comprises a controller coupled to the at least one first array of the plurality of first LEDs and the at least one second array of the plurality of second LEDs, wherein the controller is configured to individually control the at least one first array of the plurality of first LEDs and the at least one second array of the plurality of second LEDs.

Thus, the present invention is based on the concept or idea of providing a LED filament arrangement which can provide both white light and cyan light, for providing melanopic light. This is achieved by having the first array(s) of LEDs of the first LED filament(s) emitting white light, and the second array(s) of LEDs of the second LED filament(s) emitting cyan light, arranged separately, and controlled individually. Thus, the present invention provides a LED filament arrangement wherein any LED filament of the first LED filament(s) is arranged at at least a distance, D, from any LED filament of the second LED filament(s) and thus decreasing the interference between emitted light from the first LED filament(s) and the second LED filament(s).

It will be appreciated that the LED filament arrangement comprises a first LED filament(s) configured to emit white LED filament light and a second LED filament(s) configured to emit cyan light. This allows for a versatile LED filament arrangement for facilitating different lighting needs, e.g., providing melanopic light. Additionally, the LED filament arrangement is advantageous in being aesthetically attractive. According to an example of the present invention, the emitted white LED filament light may have a correlated color temperature, CCT, in a range from 1800 to 6500 K and a color rendering index, CRI, of at least 80. This example is advantageous in that the emitted white LED filament light entails a pleasant light experience for users.

It should be noted that the LED filament arrangement allows individual control of the first LED filament(s) and the second LED filament(s). This entails the LED filament arrangement to be adaptable to different lighting needs and/or desires regarding e.g. a provision of light to a specific area in a larger space wherein the LED filament arrangement is arranged.

It should also be noted that the individual control of the first LED filament(s) and the second LED filament(s) reduces the amount of cross-talk between the first LED filament(s) and the second LED filament(s). This increases the range of the melanopic activity of the LED filament arrangement light.

The present invention is further advantageous in that any LED filament of the first LED filament(s) is arranged separately from any LED filament of the second LED filament(s), at at least a distance, D. This arrangement further reduces the amount of cross-talk between the first LED filament(s) and the second LED filament(s). Accordingly, the range of the melanopic activity of the LED filament arrangement light is further elevated. In the context of this application, the wording "arranged separately" means not physically According to the present invention, there is provided a LED filament arrangement comprising a first elongated carrier and a second elongated carrier. By the term "carrier", it is here meant an (elongated) element, body, structure, or the like, suitable or configured to have LEDs arranged thereon. The LED filament arrangement further comprises at least one first encapsulant. By "encapsulant", it is here meant a material, element, arrangement, or the like, which is configured or arranged to at least partially surround, encapsulate, and/or enclose the first elongated carrier and the first array(s) of the plurality of first LEDs. Furthermore, the at least one first encapsulant comprises a first luminescent material. By "luminescent material", it is here meant a material, composition, and/or substance which is luminescent and configured to affect light in such a manner that at least some light can pass through the luminescent material. The LED filament arrangement further comprises a controller coupled to the first array(s) of the plurality of first LEDs and the second array(s) of plurality of second LEDs. By the term "controller", it is here meant a control unit, device, arrangement, or the like. By the term "coupled", it is here meant that the controller is connected, linked, and/or paired with the first and second arrays such that the controller may (individually) control the first and second arrays of the plurality first LEDs and second LEDs, respectively.

In embodiments, the emitted white LED filament light may comprise (i) the first converted light or (ii) the first converted light and the emitted first LED light.

In embodiments, at least 80% of the total luminous flux of the emitted second LED filament light may be in a wavelength range above 480 nm or in a wavelength range above 485 nm or in a wavelength range above 490 nm. This further reduces the crosstalk because (most of) the emitted second LED filament light cannot excite the first luminescent material which comprises a phosphor of the type $M'_xM_{2-2x}AX_6$ doped with tetravalent manganese, wherein M' comprises an alkaline earth cation, wherein M comprises an alkaline cation, and x is in the range of 0-1, wherein A comprises a tetravalent cation, and wherein X comprises a monovalent anion, at least comprising fluorine (F)

In embodiments, the distance, D, may be at least 5 mm, more preferably at least 10 mm, most preferably at least 15 mm. In embodiments, the distance, D, may be at most 30 mm or at most 50 mm.

In embodiments, at least 60% or at least 70% of the total luminous flux of the emitted second LED filament light may be in a wavelength range of 480-520 nm.

In embodiments, the emitted second LED light may be cyan light having a cyan dominant peak wavelength, λ, in a wavelength range of 480-520 nm or in a wavelength range of 485-520 nm or in a wavelength range of 490-520 nm.

In embodiments, the white LED filament light may have a correlated color temperature in a range from 1700K to 2500K. In embodiment, the white light is light within 15 SDCM from the black body line, preferably within 10 SDCM from the black body line, more preferably within 5 SDCM from the black body line.

In embodiments, the cyan dominant peak wavelength, λ, may be in a wavelength range of 490-505 nm or 490-500 nm.

In embodiments, the LED filament arrangement light may comprise the white LED filament light and the second LED filament light, and optionally the LED filament arrangement light is white light e.g. having a correlated color temperature in a range from 2000K to 6500K and e.g. a CRI of at least 80 or at least 85. The controller may be configured to control the correlated color temperature of the LED filament arrangement light from a first correlated color temperature to a second correlated color temperature different from said first correlated color temperature e.g. having a difference of at least 500K or at least 1000K.

Using a combination of the white LED filament light and the second LED filament light allows to control the correlated color temperature of the LED filament arrangement light relatively closely to the BBL, e.g. especially if the white LED filament light has a correlated color temperature in a range from 1700K to 2500K.

According to an embodiment of the present invention, the controller may be configured to receive control instructions from a user interface, UI, arranged to receive input from a user. The present embodiment is advantageous in that the controller may receive control instructions regarding how to control the first array(s) of the plurality of first LEDs and the second array(s) of the plurality of second LEDs from a (remote) UI, wherein the UI may be arranged to receive input from a user. This allows for an enhanced control of the LED filament arrangement. Additionally, the present embodiment facilitates the control of the LED filament arrangement for a user.

According to an embodiment of the present invention, the first luminescent material may comprise a red phosphor configured to at least partly convert the emitted first LED light into first converted light comprising red light within a wavelength range of 600-700 nm, and a green-yellow phosphor configured to at least partly convert the emitted first LED light into first converted light comprising green-yellow light within a wavelength range of 500-600 nm. Hence, the first luminescent material may comprise a red phosphor and a green-yellow phosphor, wherein the red phosphor and the green-yellow phosphor are configured to convert at least a part of the emitted first LED light according to above-mentioned conditions, respectively. The present embodiment is particularly advantageous in that it may convert emitted first LED light into (first) converted light. This allows the present embodiment to be more versatile regarding different lighting needs and/or desires, e.g. providing light within a specific wavelength range.

According to an embodiment of the present invention, the LED filament arrangement may be configured to operate in one of a first operational mode, wherein the emitted LED filament arrangement light may comprise the emitted white LED filament light and the emitted second LED filament light, and a second operational mode, wherein the emitted LED filament arrangement light may comprise one of the emitted white LED filament light and the emitted second LED filament light. Thus, the LED filament arrangement light may comprise the emitted white LED filament light and the emitted second LED filament light, pursuant to the first operational mode, or, alternatively, the emitted white LED filament light or the emitted second LED filament light pursuant to the second operational mode. The present embodiment is advantageous as it presents a more adaptable LED filament arrangement and serving to different lighting needs and/or desires. Examples may be enabling the emitted LED filament arrangement light comprising either both of the emitted white LED filament light and the emitted second LED filament light, or only one of them.

According to an embodiment of the present invention, at least one of the at least one first LED filament may be obliquely arranged with respect to at least one of the at least one second LED filament. Hence, the first LED filament(s) may be obliquely arranged (i.e. arranged inclined or arranged with an angle) with respect to the second LED filament(s). The present embodiment is particularly advantageous in that the arrangement of the first LED filament(s) and the second LED filament(s) may reduce shadows cast from the LED filament arrangement. The present embodiment is further advantageous in that it may provide a more uniform illumination. Additionally, the present embodiment is favorable due to it being aesthetically attractive. Furthermore, the present embodiment may result in a desirable effect of reduced amount of cross-talk.

According to an embodiment of the present invention, the controller may be configured to individually control the plurality of first LEDs and the plurality of second LEDs via at least one of a gradual change in intensity, beam direction and beam distribution of the emitted first LED light and the emitted second LED light, respectively. Thus, the controller may individually control the first LEDs and the second LEDs based on a gradual change in intensity, beam direction and/or beam distribution of the emitted first LED light and the emitted second LED light, respectively. The present embodiment is advantageous in that the control of above-mentioned settings of the emitted first LED light and the emitted second LED light entails a further adaptable LED filament arrangement regarding different lighting needs, requirements, and/or desired settings. In addition to this, the controller provides an increased control regarding the distribution and overall effect of the emitted first LED light and the emitted second LED light. Therefore, the amount of cross-talk may be further reduced.

According to an embodiment of the present invention, the LED filament arrangement may extend along a longitudinal axis, LA. At least one of the LED filament arrangement comprising at least two first LED filaments arranged symmetrically with respect to the longitudinal axis, LA, and the LED filament arrangement comprising at least two second LED filaments arranged symmetrically with respect to the longitudinal axis, LA, may be fulfilled. Hence, the LED filament arrangement may comprise two or more first LED filaments arranged symmetrical with respect to the longitudinal axis, LA, and/or two or more second LED filaments arranged symmetrical with respect to the longitudinal axis, LA. The present embodiment is advantageous as the emitted LED filament arrangement light may be more uniformly distributed. In addition to this, the present embodiment may present a more aesthetically attractive LED filament arrangement.

According to an embodiment of the present invention, the at least one second LED filament may further comprise at least one second encapsulant at least partially enclosing the second elongated carrier and at least partially enclosing the at least one second array of the plurality of second LEDs. The at least one second encapsulant may comprise a second luminescent material configured to at least partly convert the emitted second LED light into second converted light, wherein the emitted second LED filament light may comprise the second converted light. Hence, the second LED filament(s) may comprise (a) second encapsulant(s) which may comprise a second luminescent material configured to convert at least a part of the emitted second LED light into second converted light. The present embodiment is particularly advantageous in that it may convert emitted second LED light into (second) converted light. This enables the present embodiment to be more adaptable to different lighting needs and/or desires, e.g. providing light within a specific wavelength range.

According to an embodiment of the present invention, at least 60% of the total luminous flux of the emitted second LED filament light may be in a wavelength range of 470-520 nm. The present embodiment is advantageous in that at least 60% of the total luminous flux of the emitted second LED filament light may be confined to a narrower wavelength range. This may lower the risk of the wavelength range of the total luminous flux of the emitted second LED filament light overlapping with the excitation spectrum and/or the emission spectrum of the first luminescent material. Hence, the risk of the emitted second LED filament light being converted by the first luminescent material may be lowered. This is favorable as the risk of cross-talk is further reduced. Thus, the range of the melanopic activity of the LED filament arrangement light is increased.

According to an embodiment of the present invention, the cyan dominant peak wavelength, λ, and at least 60% of the total luminous flux of the emitted second LED filament light may be in a wavelength range of 470-500 nm. The present embodiment is advantageous in that the cyan dominant peak wavelength, λ, and at least 60% of the total luminous flux of the emitted second LED filament light may be confined to a narrower wavelength range. The risk of cross-talk may therefore be further reduced. This is favorable as it provides an increased range of melanopic activity. Additionally, the embodiment may provide an improved quality of the emitted LED filament arrangement light, associated with e.g. the CCT and/or the CRI of the emitted LED filament arrangement light.

According to an embodiment of the present invention, the cyan dominant peak wavelength, λ, and at least 80% of the total luminous flux of the emitted second LED filament light may be in a wavelength range of 480-510 nm. The present embodiment is especially advantageous in that the cyan dominant peak wavelength, λ, and at least 80% of the total luminous flux of the emitted second LED filament light may be confined to a narrower wavelength range. Hence, the risk of cross-talk may be even further reduced, resulting in an increased range of the melanopic activity.

According to an embodiment of the present invention, the emitted first LED light may be UV light. Furthermore, the first luminescent material may comprise a blue phosphor configured to at least partly convert the emitted first LED light into first converted light comprising blue light with a peak wavelength in a wavelength range of 400-470 nm.

Hence, the first luminescent material may comprise a blue phosphor configured to convert at least a part of the emitted first LED light, which may be UV light, according to above-mentioned condition. The present embodiment is particularly advantageous in that it may convert emitted first LED light into a first converted light. This allows the present embodiment to be more versatile regarding different lighting needs and/or desires, e.g. providing light within a specific wavelength range. Additionally, the present embodiment allows the use of UV light as the light source for the first LED light, presenting a further adaptable LED filament arrangement.

According to an embodiment of the present invention, the first luminescent material may comprise a luminescent materials of the type $A_3B_5O_{12}$:Ce, wherein A comprises one or more of Y, La, Gd, Tb and Lu, and wherein B comprises one or more of Al, Ga, In and Sc.

According to an embodiment of the present invention, the first luminescent material may comprise a phosphor of the type M'xM2-2xAX6 doped with tetravalent manganese, wherein M' comprises an alkaline earth cation, wherein M comprises an alkaline cation, and x is in the range of 0-1, wherein A comprises a tetravalent cation, and wherein X comprises a monovalent anion, at least comprising fluorine (F).

According to an embodiment of the present invention, the first luminescent material may comprise at least one of lutetium aluminum garnet, LuAG, phosphor, yttrium aluminum garnet, YAG, phosphor, and potassium silicon fluorine, KSiF, phosphor. Hence, the first luminescent material may comprise LuAG phosphor, YAG phosphor, and/or KSiF phosphor. The present embodiment is advantageous in that the dominant peak wavelength of the emission spectrum of the first converted light from the first luminescent material may be different with respect to the dominant peak wavelength of the emitted second LED light. The present embodiment may therefore reduce the risk of cross-talk between the first LED filament(s) and the second LED filament(s) even further.

According to an embodiment of the present invention, there is provided a LED filament lamp comprising the LED filament arrangement, and a cover comprising an at least partially transparent material. The cover at least partially encloses the at least one first LED filament and the at least one second LED filament. The LED filament lamp further comprises a connector electrically connected to the at least one first LED filament and the at least one second LED filament, for a supply of power to the plurality of first LEDs of the first LED filament(s) and the plurality of second LEDs of the second LED filament(s). By the term “cover”, it is here meant an envelope, casing, or the like. The cover comprises an (at least partially) transparent material. By (at least partially) “transparent material”, it is here meant a material, composition, and/or substance which is transparent and/or translucent. The material is configured to affect light in such a manner that at least some light can pass through the cover. The LED filament lamp further comprises an (electrical) connector. By the term (an electrical) “connector”, it is here meant a coupling, cable, or the like, which establish an (electrical) power connection between involved elements, components, or the like. The present embodiment is advantageous in that the LED filament lamp comprises a cover which at least partially encloses the first LED filament(s) and the second LED filament(s). This provides a protective barrier, blockade, etc. in regard to physical contact for the first LED filament(s) and the second LED filament(s). This is favorably as components such as LED filaments may be sensitive to physical contact.

According to an embodiment of the present invention, the LED filament arrangement may extend along a longitudinal axis, LA, wherein at least one of the at least one second LED filament may be arranged closer to the longitudinal axis, LA, compared to at least one of the at least one first LED filament. Thus, the second LED filament(s) may be arranged nearer the longitudinal axis, LA, with respect to the first LED filament(s). The present embodiment is advantageous in that it presents an aesthetically pleasing LED filament arrangement. The lighting experience may be further enhanced due to e.g., more uniformly light distribution.

According to an embodiment of the present invention, the at least one second LED filament may only comprise second LEDs i.e. only ‘cyan’LEDs.

Further objectives of, features of, and advantages with, the present invention will become apparent when studying the following detailed disclosure, the drawings, and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
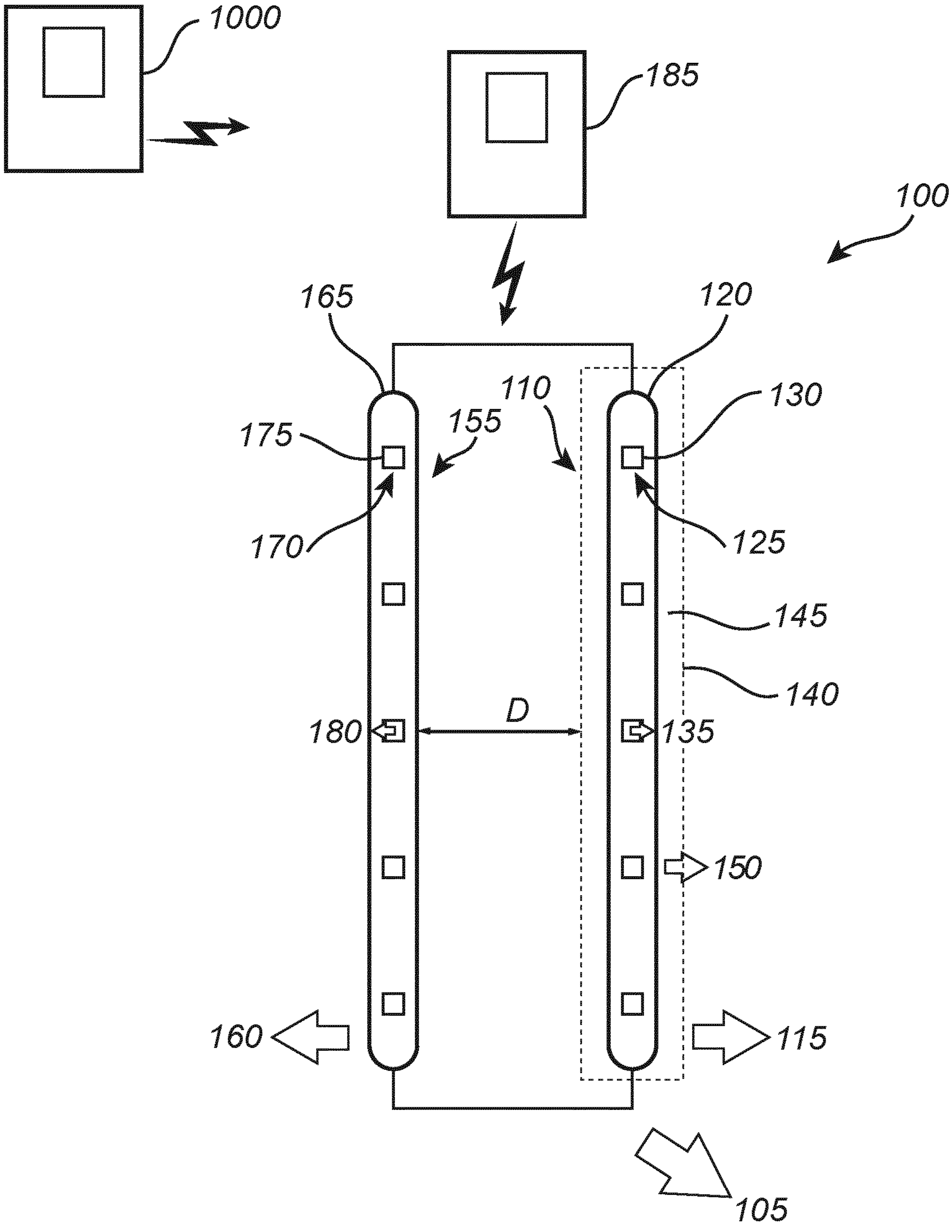
FIG. 1 is a schematic view of a LED filament arrangement according to an exemplifying embodiment of the present invention.

FIG. 1 is a schematic view of a LED filament arrangement 100 according to an exemplifying embodiment of the present invention.

The LED filament arrangement 100 in FIG. 1 is configured to emit LED filament arrangement light 105. The LED filament arrangement 100 comprises (a) first LED filament (s) 110 configured to emit white LED filament light 115 and (a) second LED filament(s) 155 configured to emit second LED filament light 160. In FIG. 1, only a (single) first LED filament 110 and a (single) second LED filament 155 is shown for reasons of simplicity. The second LED filament light 160 comprises second LED light 180 which is cyan light, with a cyan dominant peak wavelength, λ, in a wavelength range of 470-520 nm. Preferably, the first and/or second LED filaments 110, 155 has (have) a length, L, and a width, W, wherein L>5W. The first and/or second LED filaments 110, 155 may be arranged in a straight configuration or in a non-straight configuration such as for example a curved configuration, a 2D/3D spiral, or a helix.

The first LED filament(s) 110 comprises (a) first array(s) 125 of a plurality of first LEDs 130 arranged on a first elongated carrier 120, wherein the plurality of first LEDs 130 is configured to emit first LED light 135. The first LED light 135 may for example be blue light in a wavelength range of 400-490 nm. The second LED filament(s) 155 comprises (a) second array(s) 170 of a plurality of second LEDs 175 arranged on a second elongated carrier 165, wherein the plurality of second LEDs 175 is configured to emit the second LED light 180. The first and/or second elongated carrier 120, 165 may, for instance, be a substrate, that may be rigid (made from e.g. a polymer, glass, quartz, metal, or sapphire) or flexible (e.g. made of a polymer or metal e.g. a film or foil). Furthermore, the first and/or second elongated carrier 120, 165 may be (at least partially) transparent and/or translucent. In other words, the first and/or second elongated carrier 120, 165 may be configured to affect the first and/or second LED light 135, 180, respectively, in such a manner that at least some of the emitted first and/or second LED light 135, 180, respectively, can pass through.

The first LED filament(s) 110 further comprises at least one first encapsulant 140 at least partially enclosing the first elongated carrier 120 and at least partially enclosing the first array(s) 125 of the plurality of first LEDs 130. Hence, the first encapsulant(s) 140 may enclose the first elongated carrier 120 and the first array(s) 125 fully, or only partially. In some embodiments, the first LED filament(s) 110 comprises a primary and a secondary encapsulant of the first encapsulants 140. The primary encapsulant of the first encapsulants 140 may at least partially enclose a first side of the first elongated carrier 120. The secondary encapsulant of the first encapsulants 140 may at least partially enclose a second side of the first elongated carrier 120, opposite to the first side of the first elongated carrier 120. The primary encapsulant of the first encapsulants 140 may be arranged separately from the secondary encapsulant of the first encapsulants 140. It is to be understood that the arrangement of the first encapsulants 140 relative each other may vary in different embodiments. In some embodiments, the primary and the secondary encapsulants of the first encapsulants 140 may overlap at least partially with each other. The first encapsulant(s) 140 may be a polymer material which may be flexible such as for example a silicone. Additionally, the first encapsulant(s) 140 may have an elongated shape. The first encapsulant(s) 140 comprises a first luminescent material 145 configured to at least partly convert the emitted first LED light 135 into first converted light 150. The first luminescent material 145 comprises a red phosphor and a green-yellow phosphor. The red phosphor is configured to at least partly convert the emitted first LED light 135 into first converted light 150 comprising red light within a wavelength range of 600-700 nm. The green-yellow phosphor is configured to at least partly convert the emitted first LED light 135 into first converted light 150 comprising green-yellow light within a wavelength range of 500-600 nm. The white LED filament light 115 comprises the first converted light 150 and/or the emitted first LED light 135.

The first LED filament(s) 110 is arranged at a (minimum) distance, D, from the second LED filament(s) 155. This entails that the first LED filament(s) 110 is arranged separately from the second LED filament(s) 155. The distance, D, may be set to minimize the amount of cross-talk between emitted white LED filament light 115 and emitted second LED light 180.

The LED filament arrangement 100 in FIG. 1 further comprises a controller 185 which is coupled to the first array(s) 125 of the plurality of first LEDs 130 and the second array(s) 170 of the plurality of second LEDs 175. The controller 185 may be coupled or connected to the first array(s) 125 and the second array(s) 170 by wire or wirelessly. The controller 185 is configured to individually control the first array(s) 125 and the second array(s) 170. The controller 185 may individually control the first array(s) 125 and the second array(s) 170 simultaneously, or successively. One or more of control settings of the controller 185 may be different for the first array(s) 125 compared to the second array(s) 170. The controller 185 may further be configured to receive control instructions from a user interface, UI, 1000, wherein the (remote) UI 1000 is arranged to receive input from a user. In other words, the controller 185 may be controlled by the UI 1000. The control instructions may relate to e.g. varying the luminous flux of the emitted white LED filament light 115 compared to the luminous flux of the emitted second LED filament light 160. The controller 185 may be configured to receive the control instructions from the UI 1000 by wire or wirelessly. According to an example, the controller 185 comprises an antenna, e.g. a transceiver, wherein the antenna is (electrically) coupled to the controller 185. The antenna is configured to receive the control instructions from the UI 1000. Furthermore, the antenna is configured to transmit the control instructions to the controller 185. Hence, the controller 185 may receive control instructions from the UI 1000 via the antenna.

The LED filament arrangement light 105 comprises at least a part of the emitted white LED filament light 115 and/or at least a part of the emitted second LED filament light 160. The white LED filament light 115 and the second LED filament light 160 are associated with a first operational mode and a second operational mode, respectively. The LED filament arrangement 100 is configured to operate in one of the first operational mode and the second operational mode. The first operational mode may be configured to override the second operational mode when operated, and vice versa. During the first operational mode, the emission of the white LED filament light 115 and the second LED filament light 160 forms melanopic light as the emitted LED filament arrangement light 105. The white LED filament light 115 may have a CCT in a range from 1800 to 6500 K. Additionally, the white LED filament light 115 may have a CRI of at least 80.

Figure 2:
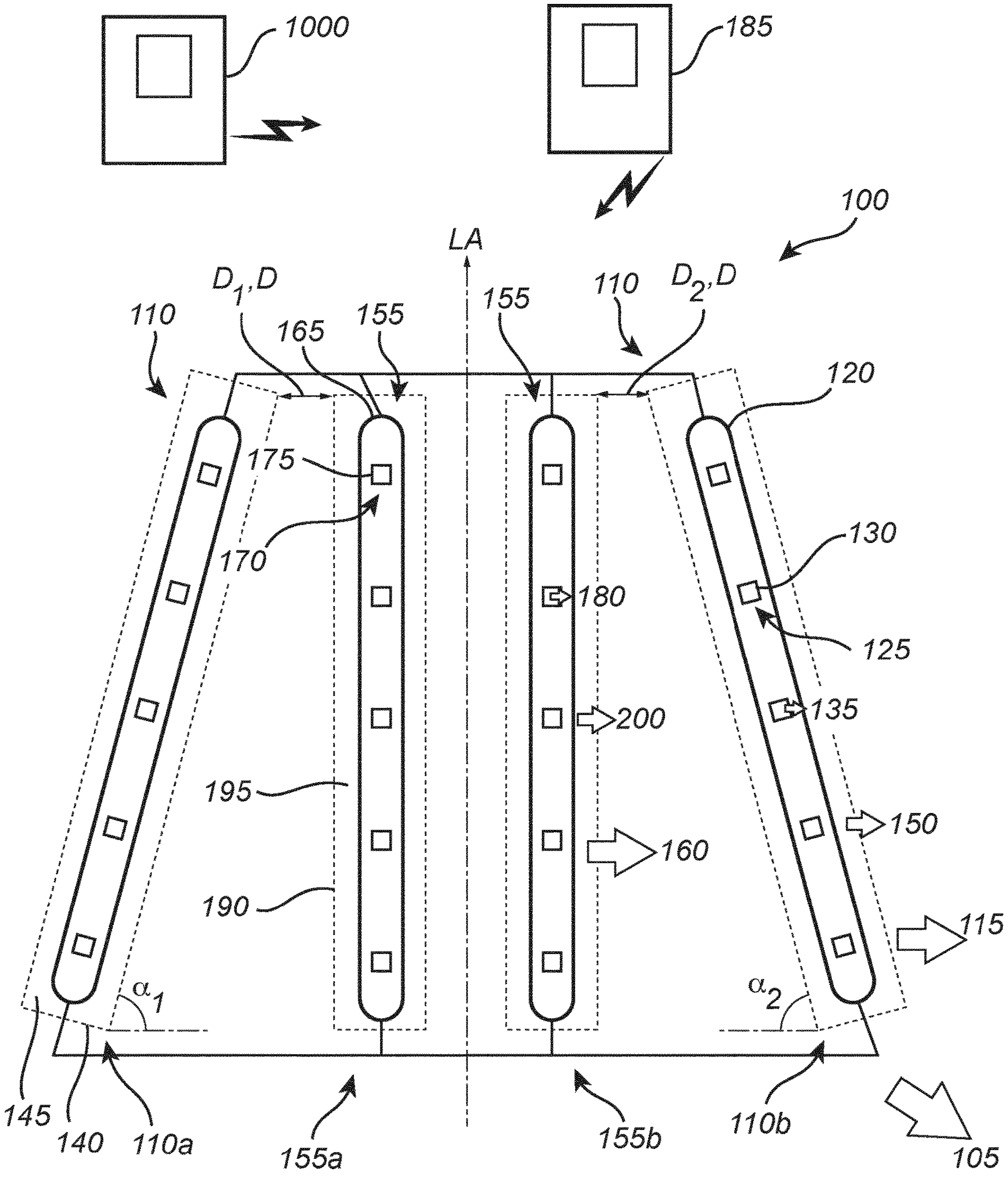
FIG. 2 is a schematic view of a LED filament arrangement according to an exemplifying embodiment of the present invention, wherein the LED filament arrangement extends along a longitudinal axis, LA.

FIG. 2 is a schematic view of a LED filament arrangement 100 according to an exemplifying embodiment of the present invention, wherein the LED filament arrangement 100 extends along a longitudinal axis, LA. It should be noted that the LED filament arrangement 100 shown in FIG. 2 has several features in common with the LED filament arrangement 100 shown in FIG. 1, and it is hereby referred to FIG. 1 and the associated text for an increased understanding of some of the features and/or functions of the LED filament arrangement 100.

The LED filament arrangement 100 in FIG. 2 comprises two first LED filaments 110 and two second LED filaments 155. It should be noted that the quantity of the first LED filaments 110 and the quantity of the second LED filaments 155 may vary in different embodiments. Furthermore, the quantity of the first LED filaments 110 and the quantity of second LED filaments 155 may be different from each other. In FIG. 2, a first LED filament 110*a* of the first LED filaments 110 is arranged at a first distance, $D_1$, from a first LED filament 155*a* of the second LED filaments 155. Furthermore, a second LED filament 110*b* of the first LED filaments 110 is arranged at a second distance, $D_2$, from a second LED filament 155*b* of the second LED filaments 155. The first and second distances, $D_1$, $D_2$, fulfills $D \le D_1, D_2$. Hence, the first distance, $D_1$, and the second distance, $D_2$, may be the same or greater than distance D. Furthermore, the first distance, $D_1$, may be different from the second distance, $D_2$. Thus, any LED filament of the first LED filaments 110 is arranged at at least a distance, D, from any LED filament of the second LED filaments 155. In FIG. 2, it follows that $D=D_1=D_2$. It should be noted that the first LED filaments 110 and the second LED filaments 155 may be arranged according to various patterns and/or designs, other than the embodiment shown in FIG. 2.

The first and second LED filament 110*a*, 110*b* of the first LED filaments 110 in FIG. 2 are arranged obliquely (i.e. arranged inclined or arranged with an angle) with respect to the first and second LED filament 155*a*, 155*b* of the second LED filaments 155, respectively. It should be noted that it is not needed that all of the first LED filaments 110 are arranged obliquely with respect to the second LED filaments 155. In some embodiments, only one first LED filament 110 may be arranged in this manner. In FIG. 2, the first LED filament 110*a* of the first LED filaments 110 is obliquely arranged at a first angle, $\alpha_1$, and the second LED filament 110*b* of the first LED filaments 110 is obliquely arranged at a second angle, $\alpha_2$, with respect to the first LED filament 155*a* and the second LED filament 155*b* of the second LED filaments 155, respectively. The first and second angle, $\alpha_1$, $\alpha_2$, fulfill $5° <= \alpha_{1,2} <= 80°$. Preferably, the first and second angle, $\alpha_1$, $\alpha_2$, fulfill $30° <= \alpha_{1,2} <= 70°$. It is worth noting that the first and second angles, $\alpha_1$, $\alpha_2$, may be the same or different. Hence, the first and second LED filaments 110*a*, 110*b* of the first LED filaments 110 may have the same or different inclination, in relation to the first and second LED filaments 155*a*, 155*b* of the second LED filaments 155, respectively. In FIG. 2, it follows that $\alpha = \alpha_1 = \alpha_2$.

In FIG. 2, the LED filament arrangement 100 extends along a longitudinal axis, LA. According to the embodiment shown in FIG. 2, both the first LED filaments 110 and second LED filaments 155 are arranged symmetrical with respect to the longitudinal axis, LA. It should be noted that it is equally feasible that only the first LED filaments 110 or only the second LED filaments 155 are arranged symmetrical with respect to the longitudinal axis, LA. Furthermore, it is not required that all LED filaments of the first LED filaments 110 and/or all LED filaments of the second LED filaments 155 are arranged symmetrical with respect to the longitudinal axis, LA.

The LED filament arrangement 100 in FIG. 2 comprises a controller 185. The controller 185 is configured to individually control the plurality of first LEDs 130 and the plurality of second LEDs 175 via a gradual change in intensity, beam direction and/or beam distribution of the emitted first LED light 135 and the emitted second LED light 180, respectively. For example, the beam direction of the emitted first LED light 135 and the emitted second LED light 180 may be individually directed such that interference thereof is minimized. Furthermore, the intensity of the emitted first LED light 135 and the emitted second LED light 180 may be individually adjusted to attain a desired ratio of intensity between the emitted first LED light 135 and the emitted second LED light 180. The controller 185 may further be configured to receive control instructions from a user interface, UI, 1000, wherein the UI 1000 is arranged to receive input from a user. The control instructions may relate to e.g. luminous flux, intensity, beam direction and/or beam distribution of the emitted white LED filament light 115 and the emitted second LED filament light 160.

Figure 4:
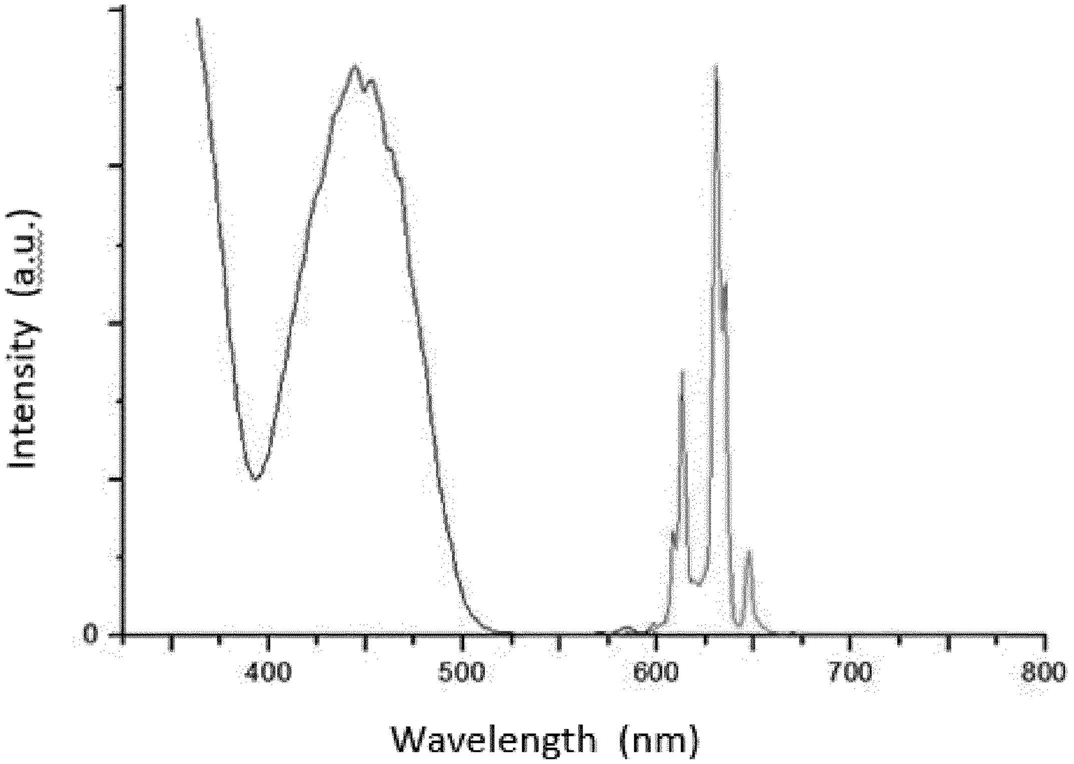
FIG. 4 schematically depicts the excitation and emission of KSiF phosphor.

The first LED filament(s) 110 comprises at least one first encapsulant 140, comprising a first luminescent material 145. According to the embodiment shown in FIG. 2, the first luminescent material 145 comprises a blue phosphor configured to at least partly convert the emitted first LED light 135 into first converted light 150. The first converted light 150 comprises blue light with a peak wavelength in a wavelength range of 400-470 nm. Furthermore, the emitted first LED light 135 is UV light. The UV light may for example be UVA, UVB, and/or UVC light. Hence, according to the embodiment shown in FIG. 2, the emitted first LED light 135 is at least partly converted by the blue phosphor to a first converted light 150 comprising blue light. According to an example, the first luminescent material 145 may further comprise a red phosphor and a green-yellow phosphor. The red phosphor is configured to at least partly convert the emitted first LED light 135 into first converted light 150 comprising red light within a wavelength range of 600-700 nm, and the green-yellow phosphor is configured to at least partly convert the emitted first LED light 135 into first converted light 150 comprising green-yellow light within a wavelength range of 500-600 nm. The emitted white LED filament light 115 comprises the first converted light 150 and/or the emitted first LED light 135, wherein the first converted light 150 may comprise the blue, red, and green-yellow light. Examples of specific phosphors that the first luminescent material 145 may comprise are lutetium aluminum garnet, LuAG, phosphor, yttrium aluminum garnet, YAG, phosphor, and/or potassium silicon fluorine, KSiF, phosphor. FIG. 4 shows the excitation spectrum and the emission spectrum of the KSiF phosphor.

The second LED filament(s) 155 further comprises at least one second encapsulant 190 at least partially enclosing the second elongated carrier 165 and at least partially enclosing the second array(s) 170 of the plurality of second LEDs 175. Hence, the second encapsulant(s) 190 may enclose the second elongated carrier 165 and the second array(s) 170 fully, or only partially. In some embodiments, the second LED filament(s) 155 comprises a primary and a secondary encapsulant of the second encapsulants 190. The primary encapsulant of the second encapsulants 190 may at least partially enclose a first side of the second elongated carrier 165. The secondary encapsulant of the second encapsulants 190 may at least partially enclose a second side of the second elongated carrier 165, opposite to the first side of the second elongated carrier 165. The primary encapsulant of the second encapsulants 190 may be arranged separately from the secondary encapsulant of the second encapsulants 190. It is to be understood that the arrangement of the second encapsulants 190 relative each other may vary in different embodiments. In some embodiments, the primary and the secondary encapsulants of the second encapsulants 190 may overlap at least partially with each other. The second encapsulant(s) 190 may be a polymer material which may be flexible such as for example a silicone. Additionally, the second encapsulant(s) 190 may have an elongated shape. The second encapsulant(s) 190 comprises a second luminescent material 195 configured to at least partly convert the emitted second LED light 180 into second converted light 200, wherein the emitted second LED filament light 160 comprises the second converted light 200.

The second LED filament(s) 155, configured to emit second LED filament light 160, comprises (a) second array (s) 170 of a plurality of second LEDs 175 configured to emit second LED light 180 being cyan light. Preferably, at least 60% of the total luminous flux of the emitted second LED filament light 160 is in a wavelength range of 470-520 nm. More preferably, at least 60% of the total luminous flux of the emitted second LED filament light 160 is in a wavelength range of 470-500 nm. Additionally, the cyan light has a cyan dominant peak wavelength, $\lambda$, in the same wavelength range of 470-500 nm. Most preferably, at least 80% of the total luminous flux of the emitted second LED filament light 160 in in a wavelength range of 480-510 nm. Additionally, the cyan light has a cyan dominant peak wavelength, $\lambda$, in the same wavelength range of 480-510 nm.

Figure 3:
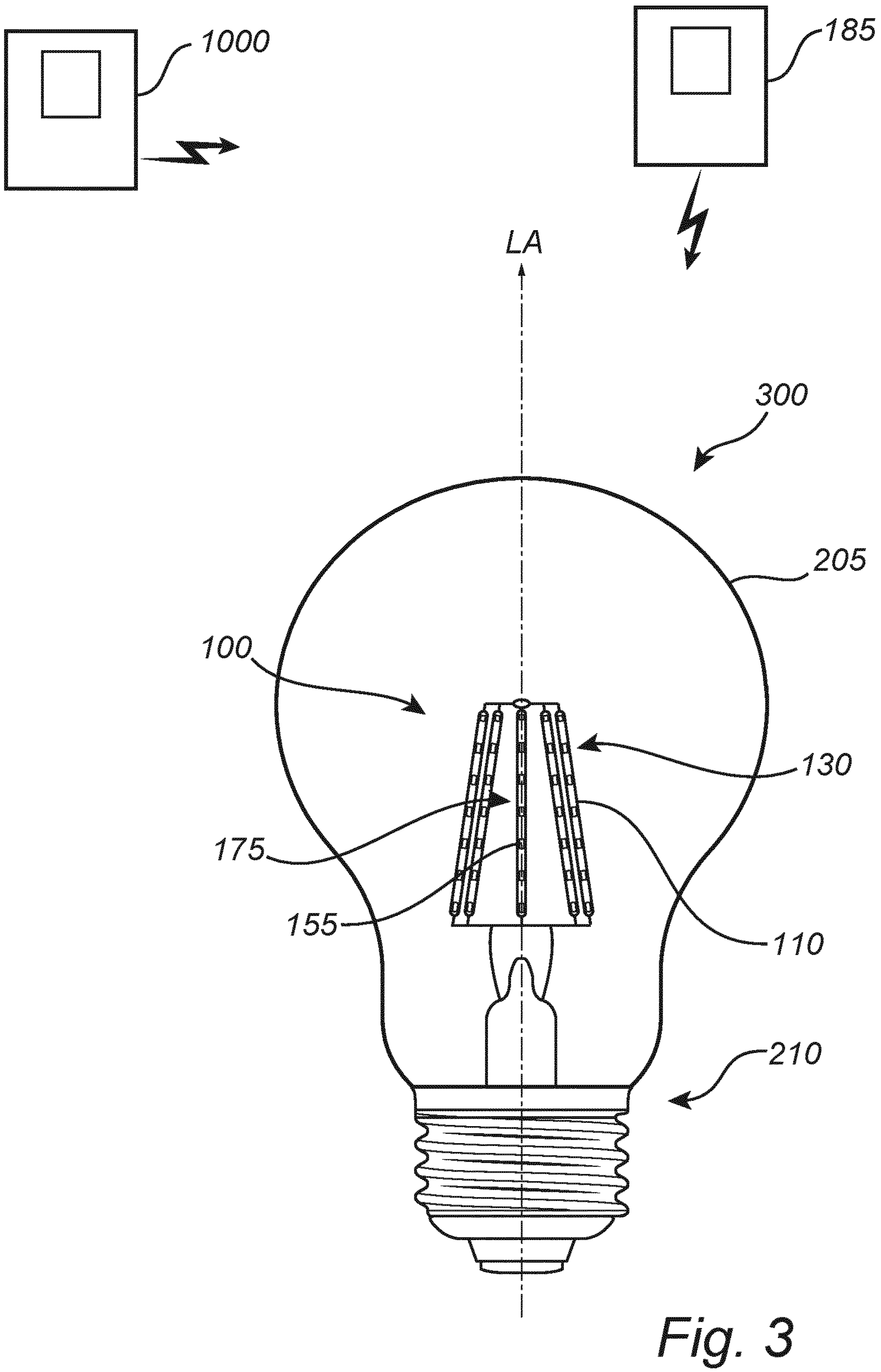
FIG. 3 is a schematic view of a LED filament lamp comprising a LED filament arrangement according to an exemplifying embodiment of the present invention.

FIG. 3 is a schematic view of a LED filament lamp 300 comprising a LED filament arrangement 100 according to an exemplifying embodiment of the present invention. It should be noted that the LED filament arrangement 100 shown in FIG. 3 has several features in common with the LED filament arrangement 100 shown in FIG. 1 and FIG. 2, and it is hereby referred to FIG. 1, FIG. 2, and the associated text for an increased understanding of some of the features and/or functions of the LED filament arrangement 100.

The LED filament lamp 300 further comprises a cover 205 comprising an at least partially transparent material. The cover 205 at least partially encloses the first LED filament(s) 110 and the second LED filament(s) 155. Hence, the cover 205 may enclose the first LED filament(s) 110 and/or the second LED filament(s) 155 fully, or only partially. The LED filament lamp 300 further comprises a connector 210 electrically connected to the first LED filament(s) 110 and the second LED filament(s) 155. This connection provides a supply of power to the plurality of first LEDs 130 of the first LED filament(s) 110 and the plurality of second LEDs 175 of the second LED filament(s) 155. The connector 210 may be arranged to provide an electrical connection between the LED filament lamp 300 and a luminaire/lamp socket. According to an example, there is provided a system comprising the LED filament lamp 300 and a user interface, UI, 1000. The UI 1000 is arranged to provide control instructions to the controller 185. Examples of control instructions may be luminous flux, intensity, beam direction and/or beam distribution of the emitted white LED filament light 115 and the emitted second LED filament light 160. The UI 1000 is further arranged to receive input from a user. Hence, the controller 185 may receive control instructions from the UI 1000, wherein the control instructions are based on at least the input from the user.

In FIG. 3, the LED filament arrangement 100 extends along a longitudinal axis, LA. Furthermore, the second LED filament(s) 155 is arranged closer to the longitudinal axis, LA, compared to the first LED filament(s) 110 arranged relative the longitudinal axis, LA. It is worth noting that it is sufficient that this condition applies between, for example, just one second LED filament 155 and just one first LED filament 110. Furthermore, the second LED filament(s) 155 may extend along, and coincide with, the longitudinal axis, LA.

The person skilled in the art realizes that the present invention by no means is limited to the preferred embodiments described above. On the contrary, many modifications and variations are possible within the scope of the appended claims. For example, one or more of the first and second LED filament(s), 110, 155, the cover 205, etc., may have different shapes, dimensions and/or sizes than those depicted/described.

The invention claimed is:

1. A light emitting diode, LED, filament arrangement, configured to emit LED filament arrangement light, comprising:

at least one first LED filament, configured to emit white LED filament light, comprising a first elongated carrier, at least one first array of a plurality of first LEDs arranged on the first elongated carrier, wherein the plurality of first LEDs is configured to emit first LED light, at least one first encapsulant at least partially enclosing the first elongated carrier and at least partially enclosing the at least one first array of the plurality of first LEDs, wherein the at least one first encapsulant comprises a first luminescent material configured to at least partly convert the emitted first LED light into first converted light, wherein the emitted white LED filament light comprises (i) the first converted light or (ii) the first converted light and the emitted first LED light, at least one second LED filament, configured to emit second LED filament light, comprising a second elongated carrier, at least one second array of a plurality of second LEDs arranged on the second elongated carrier, wherein the plurality of second LEDs is configured to emit second LED light, wherein the emitted second LED light is cyan light having a cyan dominant peak wavelength, λ, in a wavelength range of 470-520 nm, wherein the emitted second LED filament light comprises the emitted second LED light, wherein any LED filament of the at least one first LED filament is arranged at at least a distance, D, from any LED filament of the at least one second LED filament, and a controller coupled to the at least one first array of the plurality of first LEDs and the at least one second array of the plurality of second LEDs, wherein the controller is configured to individually control the at least one first array of the plurality of first LEDs and the at least one second array of the plurality of second LEDs;

wherein at least 80% of the total luminous flux of the emitted second LED filament light is in a wavelength range above 480 nm; and wherein the first luminescent material comprises a phosphor of the type M'xM2-2xAX6 doped with tetravalent manganese, wherein M' comprises an alkaline earth cation, wherein M comprises an alkaline cation, and x is in the range of 0-1, wherein A comprises a tetravalent cation, and wherein X comprises a monovalent anion, at least comprising fluorine.

2. The LED filament arrangement according to claim 1, wherein the controller is configured to receive control instructions from a user interface, UI arranged to receive input from a user.

3. The LED filament arrangement according to claim 1, wherein the first luminescent material further comprises:

a green-yellow phosphor configured to at least partly convert the emitted first LED light into first converted light comprising green-yellow light within a wavelength range of 500-600 nm.

4. The LED filament arrangement according to claim 1, wherein the LED filament arrangement is configured to operate in one of:

a first operational mode, wherein the emitted LED filament arrangement light comprises the emitted white LED filament light and the emitted second LED filament light, and a second operational mode, wherein the emitted LED filament arrangement light comprises one of the emitted white LED filament light and the emitted second LED filament light.

5. The LED filament arrangement according to claim 1, wherein at least one of the at least one first LED filament is obliquely arranged with respect to at least one of the at least one second LED filament.

6. The LED filament arrangement according to claim 1, wherein the controller is configured to individually control the plurality of first LEDs and the plurality of second LEDs via at least one of a gradual change in intensity, beam direction and beam distribution of the emitted first LED light and the emitted second LED light, respectively.

7. The LED filament arrangement according to claim 1, wherein the LED filament arrangement extends along a longitudinal axis, LA, and wherein at least one of:

the LED filament arrangement comprising at least two first LED filaments arranged symmetrically with respect to the longitudinal axis, LA, and the LED filament arrangement comprising at least two second LED filaments arranged symmetrically with respect to the longitudinal axis, LA, is fulfilled.

8. The LED filament arrangement according to claim 1, wherein the at least one second LED filament further comprises:

at least one second encapsulant at least partially enclosing the second elongated carrier and at least partially enclosing the at least one second array of the plurality of second LEDs, wherein the at least one second encapsulant comprises a second luminescent material configured to at least partly convert the emitted second LED light into second converted light, wherein the emitted second LED filament light comprises the second converted light.

9. The LED filament arrangement according to claim 1, wherein the emitted second LED light is cyan light having a cyan dominant peak wavelength, λ, in a wavelength range of 480-520 nm.

10. The LED filament arrangement according to claim 1, wherein the distance, D, is at least 15 mm.

11. The LED filament arrangement according to claim 1, wherein at least 60% of the total luminous flux of the emitted second LED filament light is in a wavelength range of 480-520 nm.

12. The LED filament arrangement according to claim 1, wherein the emitted first LED light is UV light, and the first luminescent material comprises a blue phosphor configured to at least partly convert the emitted first LED light into first converted light comprising blue light with a peak wavelength in a wavelength range of 400-470 nm.

13. The LED filament arrangement according to claim 1, wherein the first luminescent material comprises at least one of lutetium aluminum garnet, LuAG, phosphor, yttrium aluminum garnet, YAG, phosphor, and potassium silicon fluorine, KSiF, phosphor.

14. A LED filament lamp, comprising the LED filament arrangement according to claim 1, a cover comprising an at least partially transparent material, wherein the cover at least partially encloses the at least one first LED filament and the at least one second LED filament, and a connector electrically connected to the at least one first LED filament and the at least one second LED filament, for a supply of power to the plurality of first LEDs of the first LED filament and the plurality of second LEDs of the second LED filament.

15. The LED filament lamp according to claim 14, wherein the LED filament arrangement extends along a longitudinal axis, LA, and wherein at least one of the at least one second LED filament is arranged closer to the longitudinal axis, LA, compared to at least one of the at least one first LED filament arranged relative the longitudinal axis, LA.

* * * * *